United States Patent [19]
Daido et al.

[11] Patent Number: 5,097,918
[45] Date of Patent: Mar. 24, 1992

[54] MOTOR-DRIVEN POWER STEERING APPARATUS

[75] Inventors: Toshihiko Daido; Hirofumi Matsuoka; Hidetoshi Tabuse, all of Osaka, Japan

[73] Assignee: Mitsubishi Denki Kabushiki Kaisha, Tokyo, Japan

[21] Appl. No.: 377,868

[22] Filed: Jul. 10, 1989

[30] Foreign Application Priority Data

Jul. 11, 1988 [JP] Japan .................. 63-173364
Jul. 29, 1988 [JP] Japan .................. 63-191844
Mar. 1, 1989 [JP] Japan .................. 1-50357

[51] Int. Cl.⁵ ............................................ B62D 5/04
[52] U.S. Cl. .......................... 180/79.1; 364/424.05
[58] Field of Search ............ 180/79.1; 364/424.05; 318/2, 689

[56] References Cited

U.S. PATENT DOCUMENTS

| | | | |
|---|---|---|---|
| 4,664,211 | 5/1987 | Oshita et al. | 180/79.1 |
| 4,681,183 | 7/1987 | Oshita | 180/79.1 |
| 4,727,950 | 3/1988 | Shimizu et al. | 180/79.1 |
| 4,730,686 | 3/1988 | Shimizu | 180/79.1 |
| 4,800,975 | 1/1989 | Oshita et al. | 180/79.1 |
| 4,819,170 | 4/1989 | Shimizu | 180/79.1 |
| 4,837,692 | 6/1989 | Shimizu | 364/424.05 |
| 4,947,949 | 8/1990 | Morishita et al. | 364/424.05 |

FOREIGN PATENT DOCUMENTS

| | | | |
|---|---|---|---|
| 12866 | 1/1983 | Japan | 180/79.1 |
| 61-89170 | 5/1986 | Japan | |
| 6867 | 1/1987 | Japan | 180/79.1 |
| 194973 | 8/1987 | Japan | 180/79.1 |
| 41277 | 2/1988 | Japan | 180/79.1 |
| 240467 | 10/1988 | Japan | 180/79.1 |

*Primary Examiner*—Mitchell J. Hill

[57] ABSTRACT

The electric power steering apparatus of the invention is provided with a rotary detector for detecting a rotational position of a motor, a torque sensor for detecting a steering torque, and when the steering torque is within a dead zone, by increasing flow current to a motor for assisting steering force correspondingly to increase of a steering angle decided on the basis of the rotational position of the motor, the steering assisting force corresponding to the steering angle can be gained at the time of returning the steering wheel steered by mostly using by the steering torque being in the dead zone, and the proper steering assisting force can also be gained by making flow quantity corresponding to the steering angle to be minimum within a predetermined speed range and by increasing it at lower or higher speed than the predetermined speed range when the steering wheel is returned during a time of running at a low speed (such as a time of slowing down).

13 Claims, 15 Drawing Sheets

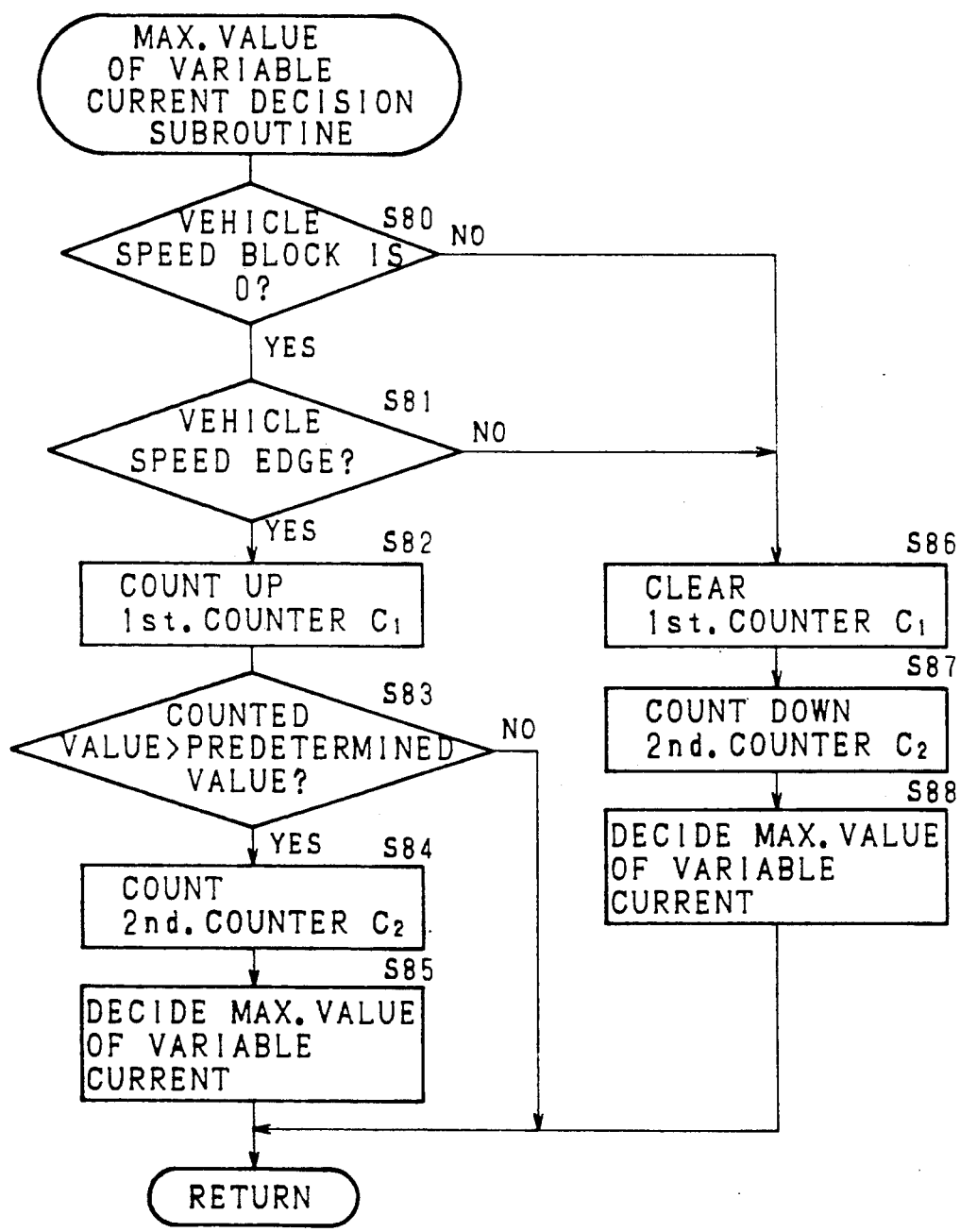

MOTOR-DRIVEN POWER STEERING APPARATUS

BACKGROUND OF THE INVENTION

1. Field of the Invention

The present invention relates to an electric power steering apparatus which assists a force required for steering operation with the turning force of a motor, especially to a control of a driving current given to the motor when a steering wheel is returned.

2. Description of Related Art

An electric power steering apparatus has been developed which provides a driver a comfortable steering feeling by driving a motor for assisting steering force on the basis of a detected result of a steering torque exerted on a steering wheel and by assisting a force required for steering a vehicle with the turning force of the motor.

The power steering apparatus consists of a rack shaft projected in the right and left direction of a vehicle body, the both ends thereof are connected to the right and left front wheels through each tie rod respectively, and a pinion shaft engaged with the rack shaft at the middle portion of the latter, interlockingly connected with the steering wheel.

Vehicles, provided with a steering mechanism of rack-pinion system for carrying out steering operation by changing rotations of the pinion accompanying the rotational operation of the steering wheel into a movement of longitudinal direction of the rack shaft, are divided broadly into the following two categories according to the set position of the motor for assisting steering force. That is, the one wherein, the shaft of the above said pinion is further projected from the engaged position with the rack shaft, the aforesaid motor being provided at the projected portion through an appropriate speed reducer in order to transfer the turning force, and the other wherein, an auxiliary pinion engaged with the aforesaid rack shaft is provided at a position in the axial direction different from aforesaid engaged position of the pinion, the aforesaid motor being provided at the aforesaid auxiliary pinion through an appropriate speed reducer in order to transfer the turning force, the former being named a one-pinion system, and the latter named a two-pinion system respectively according to the number of pinions engaged with the rack shaft.

In any power steering apparatus aforementioned, there has been a problem that return of the steering wheel after the steering operation tends to be disturbed by force of inertia of the motor and frictional resistance of the speed reducer, since the turning force of the motor for assisting steering force is transferred to the projected portion of the shaft of the pinion or the auxiliary pinion through the speed reducer. In order to solve this problem, an invention has been devised to perform return control of the steering wheel, shifting the characteristics in parallel according to the steering angle. (for example, Japanese Patent Application Laid-Open No. 61-89170, 1986)

In that invention, however, the characteristic of an indicator current for controlling the motor corresponds to the steering angle, thereby the assist characteristic during the time of steering operation and the return characteristic during the time of the returning change simultaneously in the whole region of the steering torque, whereby the assisting force is reduced when the steering angle is large, leading to a problem that the return characteristic and assist characteristic can not be set freely.

Another prior art device assists restoring force by the motor correspondingly to the vehicle speed. This reduces the quantity of indicator current to the motor corresponding to a decrease of the vehicle speed.

In the case where the indicator current is reduced to the motor corresponding to the decrease of the vehicle speed, however, the return control cannot be fully performed at low vehicle speed, thereby an appropriate neutral feeling of the steering wheel can not be obtained. That is to say, during the time of low vehicle speed, the friction of the wheels is large, and, large assisting force is required. In the case where the vehicle is to be housed in a garage while going backward in a low speed with a large steering angle, for example, a driver must perform a complicated operation such as looking at the steering wheel, while looking backward in order to return the steering wheel to the middle point, as the conventional returning control is weak in steering assisting force

SUMMARY OF THE INVENTION

The present invention has been devised in consideration of such circumstances. The first object of the invention is to provide a power steering apparatus capable of making the indicator current characteristic of return control and the indicator current characteristic of assist control as successive characteristics, thereby reducing the sense of incompatibility, and capable of setting the assist characteristic and the return characteristic freely especially when a vehicle control is combined to the successive characteristics, thus providing comfortable steering characteristics by changing the indicator current characteristic correspondingly to the steering angle when the steering torque is in a dead zone (i.e. those torque values for which no indicator current is ordinarily provided).

The second object of the invention is to provide a power steering apparatus capable of providing enough returning assisting force even at low vehicle speed, with the steering operation being simplified, and providing comfortable steering characteristics by changing the indicator current characteristic corresponding to the steering angle and the vehicle speed and increasing the indicator current characteristic of the return control at a time of low speed when the steering torque is within the dead zone at the return time of the steering wheel.

The above and further objects and features of the invention will more fully be apparent from the following detailed description with accompanying drawings.

BRIEF DESCRIPTION OF THE DRAWINGS

FIG. 14 and FIG. 15 are flow charts of variable current.

DESCRIPTION OF THE PREFERRED EMBODIMENTS

Figure 1:
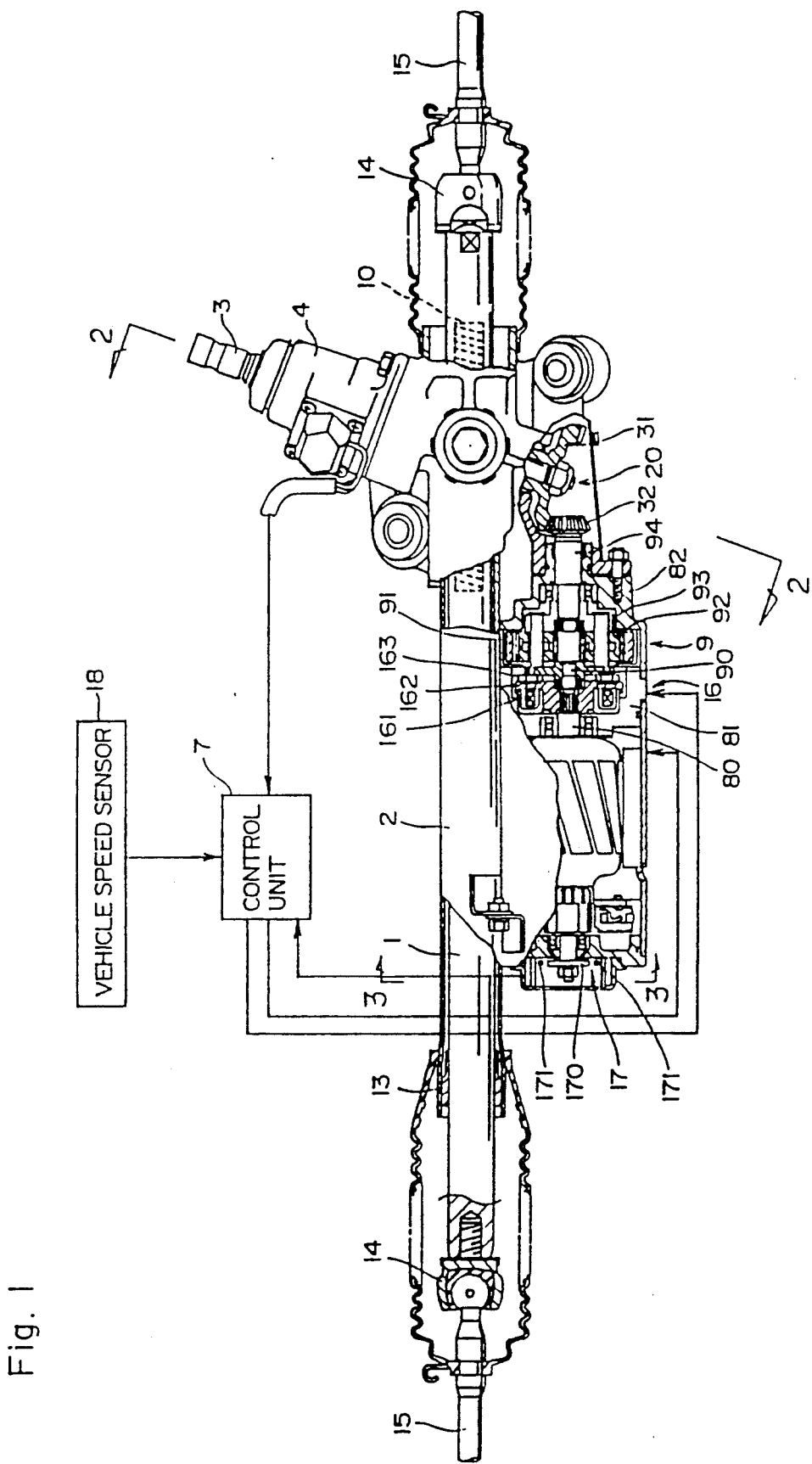
FIG. 1 is a partially broken front view showing one embodiment of a power steering apparatus according to the invention.
Figure 2:
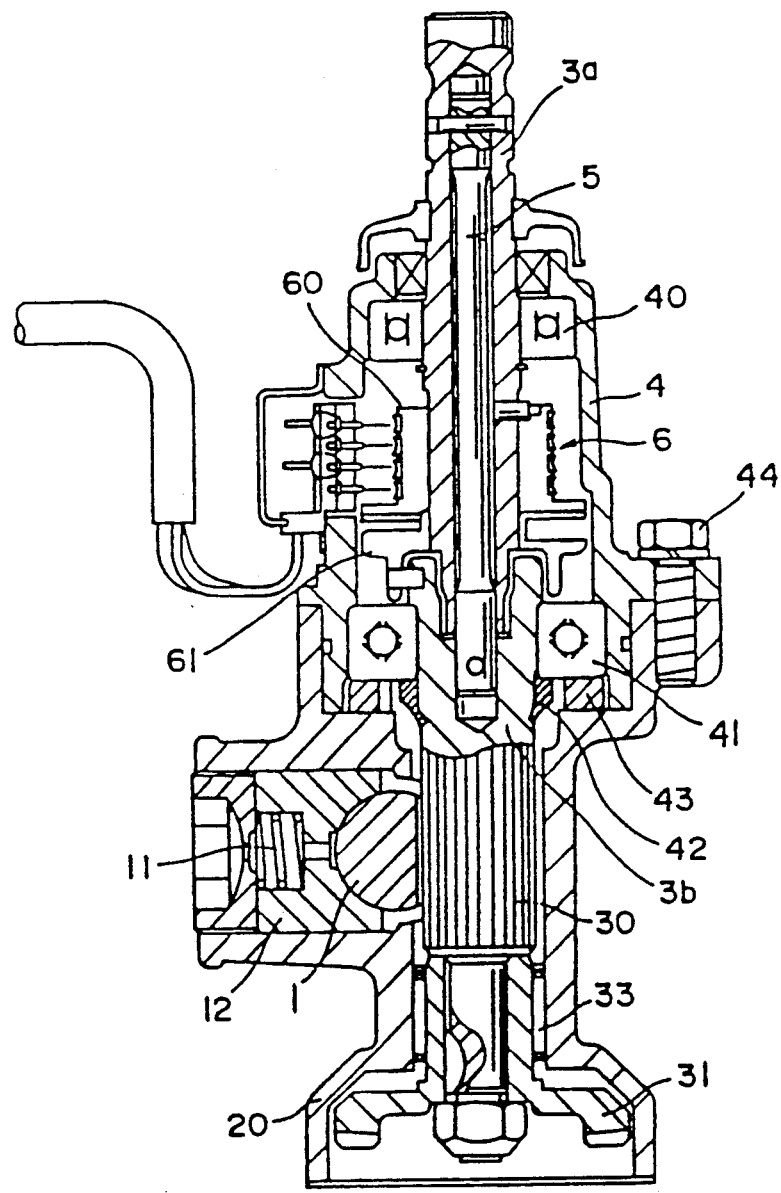
FIG. 2 is an enlarged sectional view of the embodiment along line II—II of FIG. 1.
Figure 3:
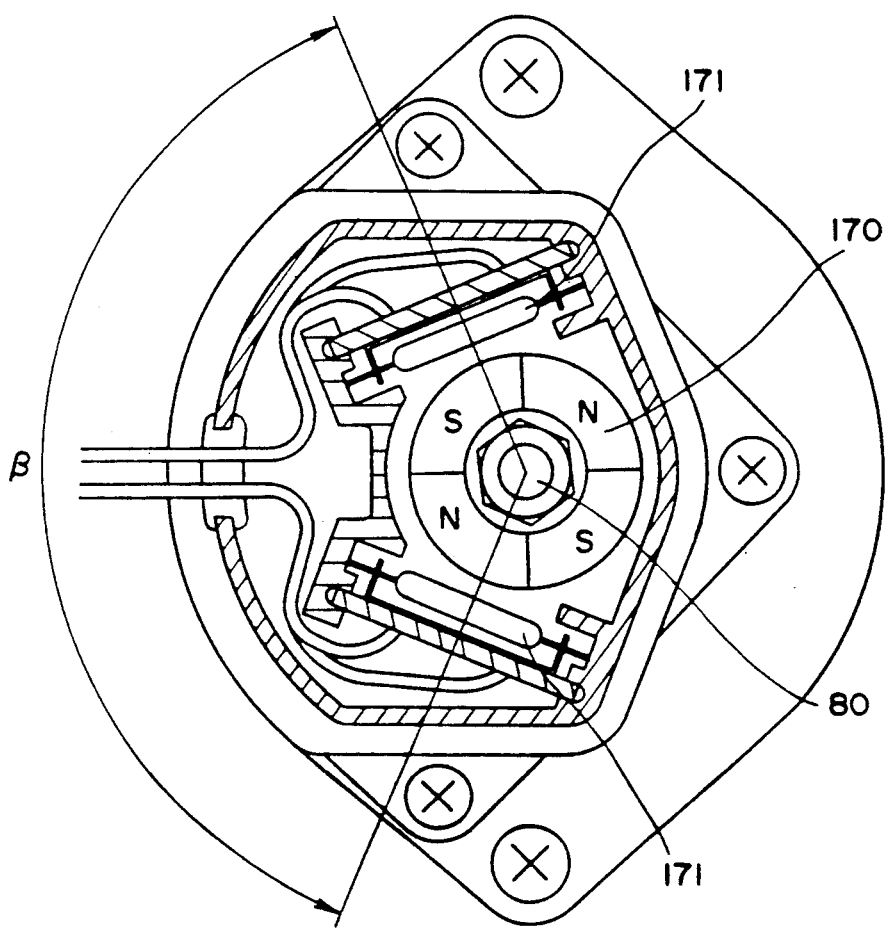
FIG. 3 is an enlarged sectional view showing the construction of a rotary detector along line III—III of FIG. 1.

The present invention will be described referring to the drawings showing embodiments thereof. FIG. 1 is a partially broken front view of a power steering apparatus related to the invention. FIG. 2 is an enlarged sectional view of the embodiment along line II—II of FIG. 1. FIG. 3 is an enlarged sectional view showing construction of a rotary detector along line III—III of FIG. 1.

In the figures reference numeral 1 designates a rack shaft inserted concentrically within a cylindrical rack shaft case 2 fixed at a part of a vehicle body with its longitudinal direction as the right-left direction. Numeral 3 is a pinion shaft supported rotatably such that the shaft center thereof intersects obliquely against the rack shaft 1 at the inside of a pinion shaft case 4 connected in the vicinity of one end portion of the rack shaft 2.

The pinion shaft 3, as shown in FIG. 2, consists of an upper shaft 3a and a lower shaft 3b connected coaxially with each other through a torsion bar 5, the upper shaft 3a being supported inside of the pinion shaft case 4 by a ball bearing 40 with its upper end portion interlockingly combined to a steering wheel through a universal joint not shown. The upper end portion of the lower shaft 3b is supported inside of the pinion shaft case 4 by a four-point contact ball bearing 41 such that the proper length of the under portion thereof is projected from a downside opening of the pinion shaft case 4. The four-point contact ball bearing 41 is fitted from outside to the lower shaft 3b from the lower end portion side, and is positioned outside of the lower shaft 3b in the axial direction with both sides of the inner ring being held by steps formed in the vicinity of the upper end portion of the lower shaft 3b and collar 42 fixed from outside from the lower end portion side and caulked to the peripheral surface. Then, it is fitted into the pinion shaft case 4 together with the lower shaft 3b from the aforementioned downside opening, and is positioned inside of the pinion shaft case 4 in the axial direction with both sides of the outer ring being held by a circular shoulder part formed at the lower part of the case 4 and a lock nut 43 screwed to the case 4 from the opening, and loads a radial load acting upon the lower shaft 3b and thrust load in both directions.

At the middle portion of the lower shaft 3b projected from the pinion shaft case 4, pinion teeth 30 in an appropriate length are formed in the axial direction thereof. In the case where the pinion shaft case 4 is fixed at the upper side of aforesaid rack shaft case 2 by fixing bolt 44, the pinion teeth 30 engages with rack teeth 10 formed at a position a little close to one end portion of the rack shaft 1 in the axial direction thereof in an appropriate length inside of the rack shaft case 2, making the lower shaft 3b with rack shaft 1 engage, with their shaft centers intersecting obliquely with each other. The lower shaft 3b extends downward further from the position of engagement with the rack shaft 1, and a big bevel gear 31 with the teeth-formed face thereof tilting downward is mounted coaxially with the lower shaft 3b at the lower end portion thereof. The lower shaft 3b is supported by needle roller bearing 33 in a bevel gear housing 20 connected following the downside of the rack shaft case 2 for surrounding the big bevel gear 31. Accordingly, the lower shaft 3b is supported at both sides of the position of engagement of the rack teeth 10 with the pinion teeth 30 by the four-point contact ball bearing 41 and needle roller bearing 33 so that the flexing quantity of the lower shaft 3b at the position of engagement is kept within the tolerance.

Furthermore at the position of engagement of the rack teeth 10 with the pinion teeth 30, a pressing piece 12 for pressing the rack shaft 1 by the biasing force of a pressing spring 11 in front of the pinion shaft 3 is provided so that the rack teeth 10 and the pinion teeth 30 can be engaged without any gap. The rack shaft 1 is, at the position of engagement, supported by the pressing piece 12 and the lower shaft 3b so that it is held from both sides of radial direction as well as it is supported by bearing bush 13 fitted into an end portion of the rack shaft case 2 opposite to the connected position of the pinion shaft case 4 with itself, it being movable freely in its axial direction inside of the rack shaft case 2. Both right and left end portions of the rack shaft 1 projected respectively at both sides of the rack shaft case 2 are connected to tie rods 15, 15 stretching respectively to the right and left wheels not shown through respective ball and socket joints 14, 14, the wheels being steered to right or left according to the movement of the rack shaft 1 in the axial direction thereof.

In FIG. 2, reference numeral 6 designates a torque sensor for detecting steering torque exerted on the steering wheel. The torque sensor 6 uses a potentiometer comprising a resistance holding member 60 which is outfitted to the upper shaft 3a, rotates therewith, and at the downside end surface, forms a circular resistance element with the shaft center of the upper shaft 3a being the center, and a detecting piece holding member 61 which is outfitted to the lower shaft 3b, rotates therewith and, at the upside end surface forms a detecting piece which slidably contacts a point in a radial direction on the resistance element. The upper shaft 3a of the pinion shaft 3 rotates around the axial shaft according to the rotation of the steering wheel, while road surface resistance acting upon the wheels acts upon the lower shaft 3b through the rack shaft 1. Therefore torsion corresponding to the steering torque exerted on the steering wheel is produced at torsion bar 5 interposed between the two shafts. The torque sensor 6 outputs relative displacement in the circumferential direction created between the upper shaft 3a and the lower shaft 3b accompanying the torsion of the torsion bar 5, as a potential corresponding to the contact position of the detecting piece with the resistance. In the case where the steering operation is not performed, it is initialized so as to output a specified reference potential. The output signal of the torque sensor 6 is inputted in a control unit 7 which compares the signal with the reference potential to recognize the direction and size of tile steering torque, then generates a driving signal to a motor 8 for assisting steering force as described later.

The motor 8 for assisting steering force is to transmit the turning force thereof to the aforementioned lower shaft 3b through an electromagnetic clutch 16, epicycle reduction gear 9 and small bevel gear 32 which engages with the big bevel gear 31 and is smaller than the big bevel gear 31 in diameter.

The electromagnetic clutch 16 consists of a coil unit 161 which is annular in shape and fixed to a middle case 81 of the motor 8, a moving unit 162 which is outfitted at one side of a rotation axis 80 of the motor 8 coaxially therewith and rotates with the rotation axis 80, and an engaging part 163 which is discoid in shape, faces the moving unit 162 and engages with the moving unit 162 by electromagnetic force caused by power supplied to the coil unit 161, performing engaging and disengaging of the motor 8.

The epicycle reduction gear 9 consists of a sun shaft 90 which is fitted into the engaging part 163, rotates and has a sun gear supported at one end thereof by a bearing fitted into the moving unit 162, and supported at the other end by a bearing fitted into a planet carrier 93 to be described later, an outer ring 91 which is circular in shape and fixed to a casing end surface 82 of the motor 8 coaxially with the rotation axis 80, a plurality of planet gears 92, 92 . . . which rotatably contacts with the inner surface of the outer ring 91 and with the outer surface of the sun gear of the sun shaft 90 respectively, autorotate around the shaft center respectively as well as revolve around the shaft center of the sun gear, and the planet carrier 93 which supports rotatably respective planet gears 92, 92 . . . . The epicycle reduction gear 9 has a smaller outer diameter than that of the motor 8 and is integrated with the motor 8 and electromagnetic clutch 16 at one side of the rotation axis 80. An output shaft 94 of the epicycle reduction gear 9 is fitted into and fixed at a position of the shaft center of t he planet carrier 93 which is positioned coaxially with the rotation axis 80 of the motor 8, and is projected in an appropriate length outside of the casing. At the tip portion of the output shaft 94, the small bevel gear 32 is fixedly mounted with its teeth-formed face turned toward the tip portion side, the small bevel gear 32 being constructed so as to rotate, together with the output shaft 94, corresponding to the revolution of the planet gears 92 92 . . . .

The motor 8 electromagnetic clutch 16 and epicycle reduction gear 9 are fixed onto a bracket 2a provided outside of the rack shaft case 2, so that these shaft centers are approximately parallel to the shaft center of the rack shaft 1 and are fitted into the bevel gear housing 20 with the small bevel gear 32 being inside. At the inside of the aforesaid housing 20, the small bevel gear 32 is engaged with the big bevel gear 31 fixedly mounted at the lower end portion of the aforesaid lower shaft 3b.

Backlash adjustment between the big bevel gear 31 and the small bevel gear 32, in fitting the epicycle reduction gear 9 into the bevel gear housing 20, can be performed easily by changing thickness and/or number of shims to be interposed at the abutting portion of the casing of the epicycle reduction gear 9 with the bevel gear housing 20.

On the other side of the rotation axis 80 of the motor 8, a rotary detector 17 for detecting the rotational position of the motor 8 is provided. The rotary detector 17 consists of a magnet board 170 outfitted at the other side of the rotation axis 80 of the motor 8 and being discoid in shape, having two N-poles and two 5-poles, and two reed switches 171, 171 fitted at a specified angle of incidence of B (in the embodiment, $\beta = 135°$ around the magnet board 170.

Figure 4:
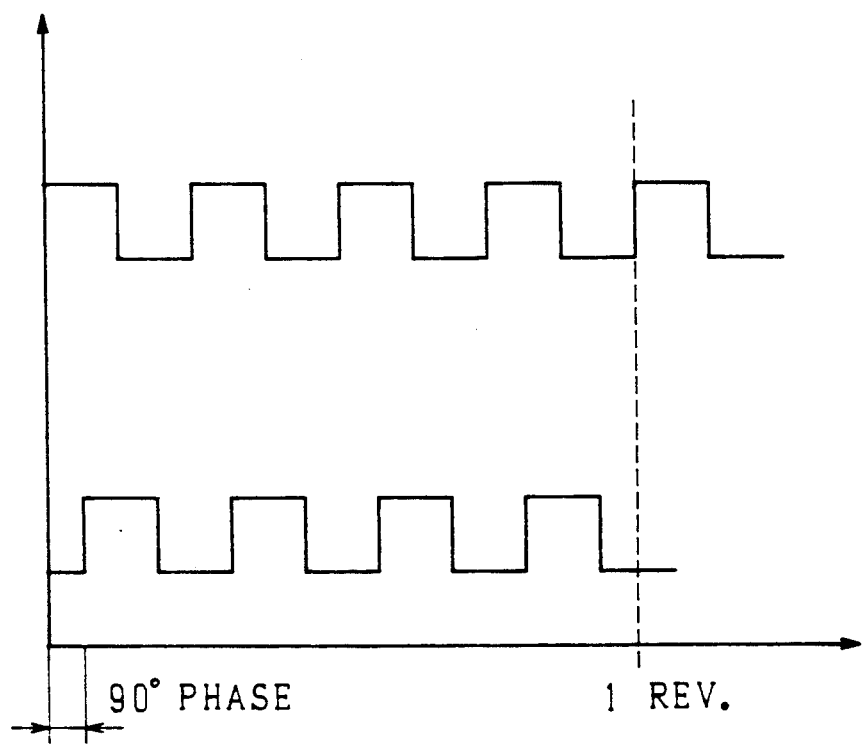
FIG. 4 is a waveform chart showing the output waveform of the rotary detector.

FIG. 4 is a waveform chart indicating an output waveform of the rotary detector 17. As the two reed switches 171, 171 are fitted at the angle of incidence $\beta$ being 135°, the output wave form is outputted with the phase deviating by 90°. The rotary detector 17 has a resolution of 1/16 of one rotation by detecting leading and trailing edges as respective four waveforms are outputted by one rotation.

The rotary detector 17, when compared with the conventional rotary detectors such as a tachogenerator and the like, is capable of detecting the relative position of a rotor. It is also small, has a great resistance to high temperature, has little age deterioration and is compared with a rotary encoder of a photointerrupter type. Still, as the output waveform becomes the pulse output, the detected result can be taken easily into CPU such as micro computer and the like.

Also in the control unit 7, the output signal of the rotary detector 17 and the output signal of a vehicle speed sensor 18 for detecting vehicle speed are inputted as well as the output signal of the torque sensor 6, and hereupon the control to be described later is carried out, a driving signal for driving the motor 8 and the electromagnetic clutch 16 is outputted.

Next explanation will be given of the control at the control unit 7.

Figure 5:
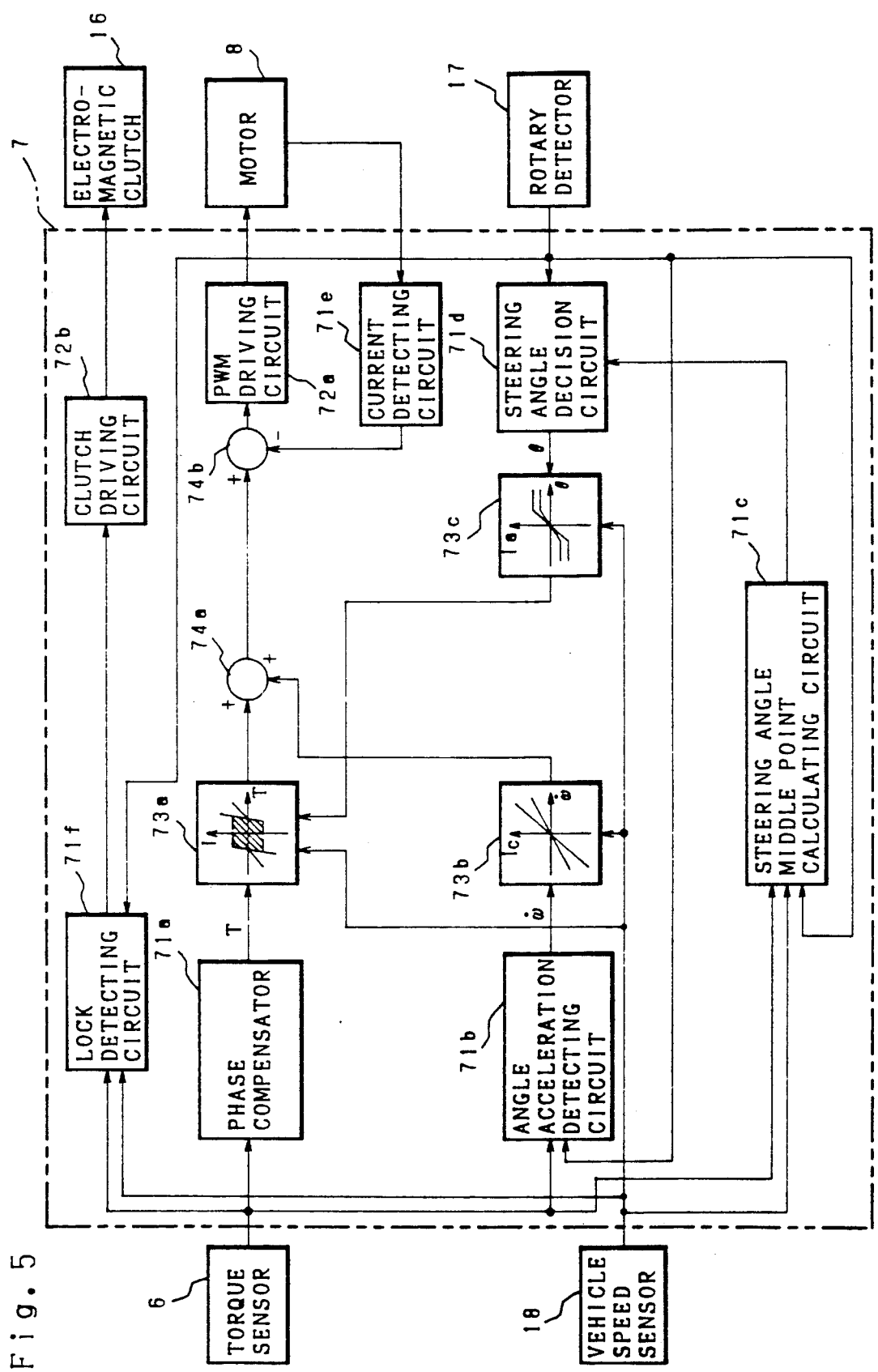
FIG. 5 is a block diagram showing construction and operation of a control unit.

FIG. 5 is a block diagram showing the construction and operation of the control unit.

The torque detecting signal of the torque sensor 6 is inputted respectively to a phase compensator 71a for advancing the phase thereof and making response better, an angle acceleration detecting circuit 71b for detecting an angle acceleration $\omega$ of the rotation of the steering wheel, a steering angle middle point calculating circuit 71c for deciding the middle point of the steering mechanism, and a lock detecting circuit 71f for detecting a lock of the motor 8.

The vehicle speed detecting signal of the vehicle speed sensor 18 is respectively inputted to an indicator current function unit 73a or first electric current control means which is given the outputs from the lock detecting circuit 71f, the steering angle middle point calculating circuit 71c, the phase compensation circuit 71a and variable current Ia to be described later, and decides an indicator current I to be given to the motor 8 corresponding to the torque, variable current Ia and vehicle speed. The vehicle speed signal is also provided to a compensation current function unit 73b which is given the angle acceleration $\omega$ of the steering wheel outputted from the angle acceleration detecting circuit 71b and decides a compensation current Ic compensating the force of inertia during the acceleration and deceleration time of the motor 8 and the force of inertia of a base carrier corresponding to the angle acceleration $\omega$ and the vehicle speed. A variable current function unit 73c which is given a steering angle $\theta$ outputted from a steering angle decision circuit 71d to be described later and together with circuit 73a forms a second electric current control means which decides upon a variable current Ia which changes the characteristics of the indicator current I when the torque T is small and in the dead zone, (i.e. those torque values for which no indicator current is ordinarily provided) corresponding to the steering angle $\theta$ and vehicle speed.

As shown in FIG. 5, variable current Ia increases as the steering angle $\theta$ becomes larger until the steering angle $\theta$ reaches the specified value, and after that the variable current shows a constant value. The increasing rate thereof becomes larger as the vehicle speed increases.

The rotary detecting signal of the rotary detector 17 is inputted to the steering angle decision circuit 71d which decides the steering angle θ by the lock detecting circuit 71f, the steering angle middle point calculating circuit 71c, the angle acceleration detecting circuit 71b and the rotary detecting signal and the middle point of the steering angle middle point calculating circuit 71c.

The lock detecting circuit 71f detects the rotation of the motor 8 when the torque and the vehicle speed are respectively larger than the specified value by the inputted rotary detecting signal, vehicle speed detecting signal and torque detecting signal thereby detecting the presence of the lock, the output signal thereof being given to the electromagnetic clutch 16 through a driving circuit 72b. The output signal of the indicator current function unit 73a is inputted to an adder 74a thereupon the output signal of the compensation current function unit 73b being added, and the added result being given to a subtractor 74b.

At the subtractor 74b, a feedback signal from a current detecting circuit 71e for detecting consumed current from the motor 8 is subtracted from the aforesaid added result, the subtracted result being given to the motor 8 through PWM (Pulse-Width Modulation) driving circuit 72a.

Next, explanation will be given on the operation.

Figure 6:
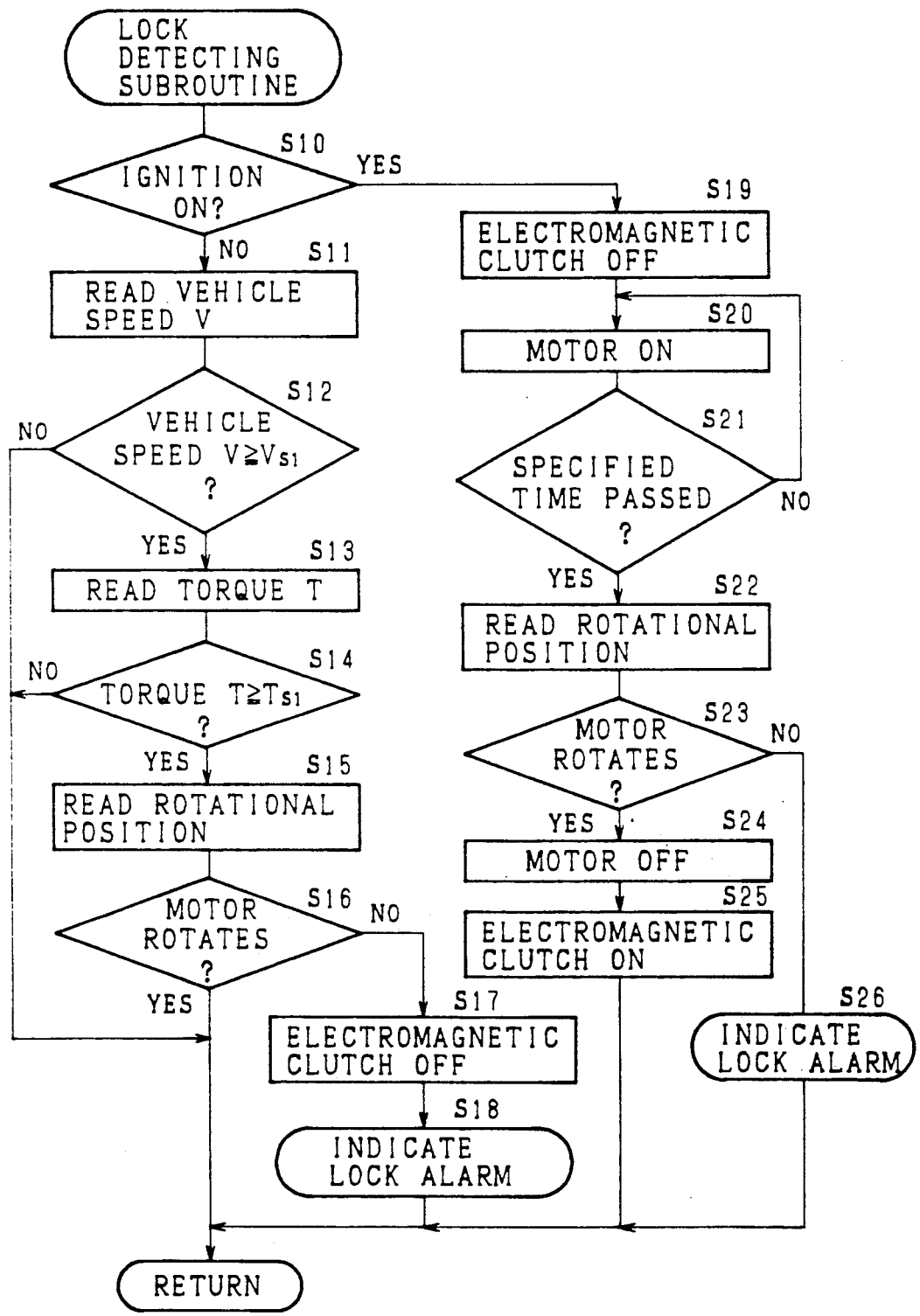
FIGS. 6–10 are flow charts explanatory of each control operation.

FIG. 6 is a flow chart showing a control of lock detection which is an essential point of the invention. In Step 10, whether or not an ignition switch is ON is judged, and when not ON, the vehicle speed V of a vehicle speed sensor 18 is read in Step 11. In Step 12, whether or not the vehicle speed V is larger than the vehicle speed threshold $V_{S1}$ is judged, and when larger, the steering torque T from the torque sensor 6 is read in next Step 13. In Step 14, whether or not the steering torque T is larger than the torque threshold $T_{S1}$ is judged, and when larger, the rotational position of the motor 8 from the rotary detector 17 is read in Step 15, and whether or not the motor 8 is rotating is judged on the basis of the value in Step 16. When the motor 8 is rotating, processing returns, and when it is not rotating, the lock detecting circuit 71f detects that the motor 8 is judged to be locked, and in Step 17, the electromagnetic clutch 16 is OFF, the connecting of the motor 8 with the epicycle reduction gear 9 being cut off, thereby freeing the steering mechanism from the motor 8. And in Step 18, a lock alarm not shown is ON and processing returns.

On the other hand, if the ignition switch is judged to be the ON in Step 10 the electromagnetic clutch 16 is OFF in Step 19, and the motor 8 is ON in Step 20. When the motor 8 is ON, the passage of the specified time is judged in Step 21, and after that, in Step 22, the rotational position of the motor 8 from the rotary detector 17 is read, and whether or not the motor 8 is rotating is judged in Step 23 on the basis of the value. When the motor 8 is rotating, the motor 8 is OFF in Step 24, and the electromagnetic clutch 16 is ON in Step 25. When the motor 8 is judged not to be rotating in Step 23, the lock alarm is ON in Step 26 and processing returns.

Next, explanation will be given on the angle acceleration detection and the motor inertia control using thereof.

Figure 7:
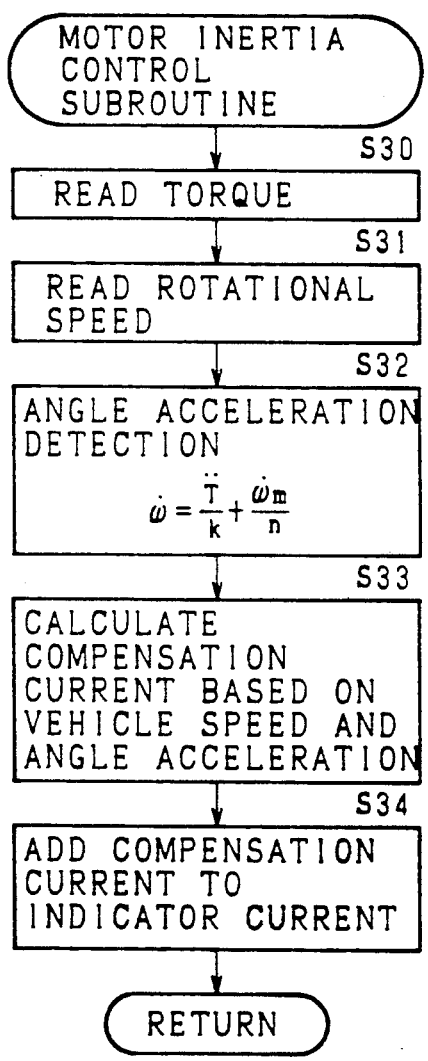

FIG. 7 is a flow chart showing the angle acceleration calculation and the motor inertia control using thereof.

At first in Step 30, the torque T from the torque sensor 6 is read, and next, in Step 31, the rotational speed $\omega_m$ of the motor 8 from the rotary detector 17 is read at the angle acceleration detecting circuit 71b, and in Step 32, the angle acceleration ω of the steering wheel is calculated in the following arithmetic operation.

$$T = K(\theta_i - \theta_o)$$

$$\theta_i - \theta_o = \frac{T}{K}$$

$$\theta_i - \theta_o = \frac{T}{K}$$

$$\theta_i = \frac{T}{K} + \theta_o$$

on the other hand $$\theta_o = \frac{\omega_m}{n}$$

n is reduction ratio $$\therefore \theta_o = \frac{\omega_m}{n}$$

$$\theta_i = \omega = \frac{T}{K} + \frac{\omega_m}{n}$$

Here, K indicates a spring constant of a torsion bar, n indicates a reduction ratio.

Next, is Step 33 by the angle acceleration ω and the vehicle speed V given to the steering wheel calculated in Step 32, the compensation current Ic compensating the effects created by the force of inertia of the motor 8 and by the force of inertia of the base carrier is determined at the compensation current function unit 73b. Next, in Step 34, the compensation current Ic calculated in Step 33 is inputted into the adder 74a, and the indicator current I calculated at the indicator current function unit 73a is added thereto. This enables the compensation current Ic, corresponding to the force of inertia of the motor 8 and that of the base carrier when the angle acceleration is detected at the starting time and finishing time of steering assistance by the motor 8, is added to the indicator current I, thereby improving the steering feeling.

Figure 8:
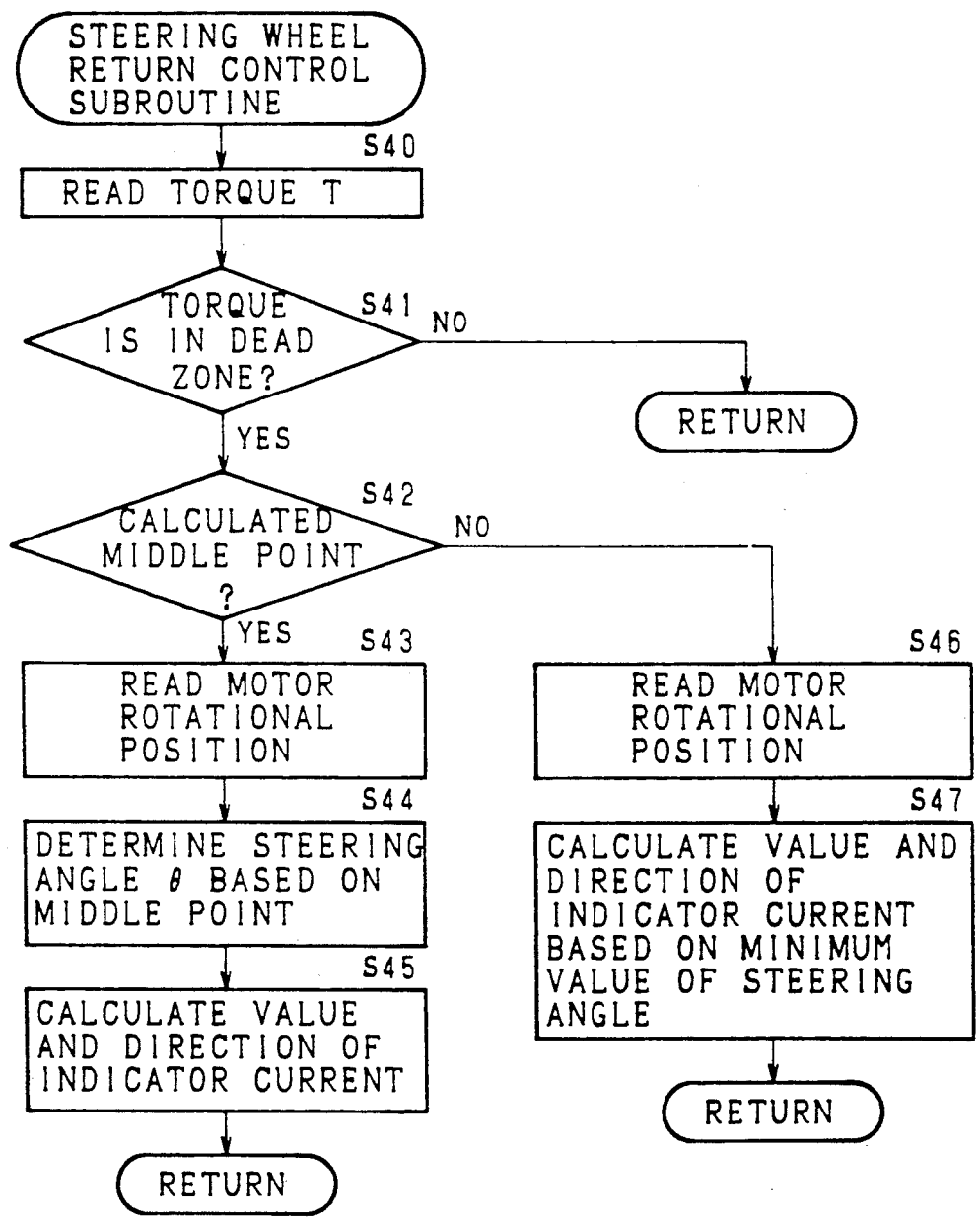
Figure 9:
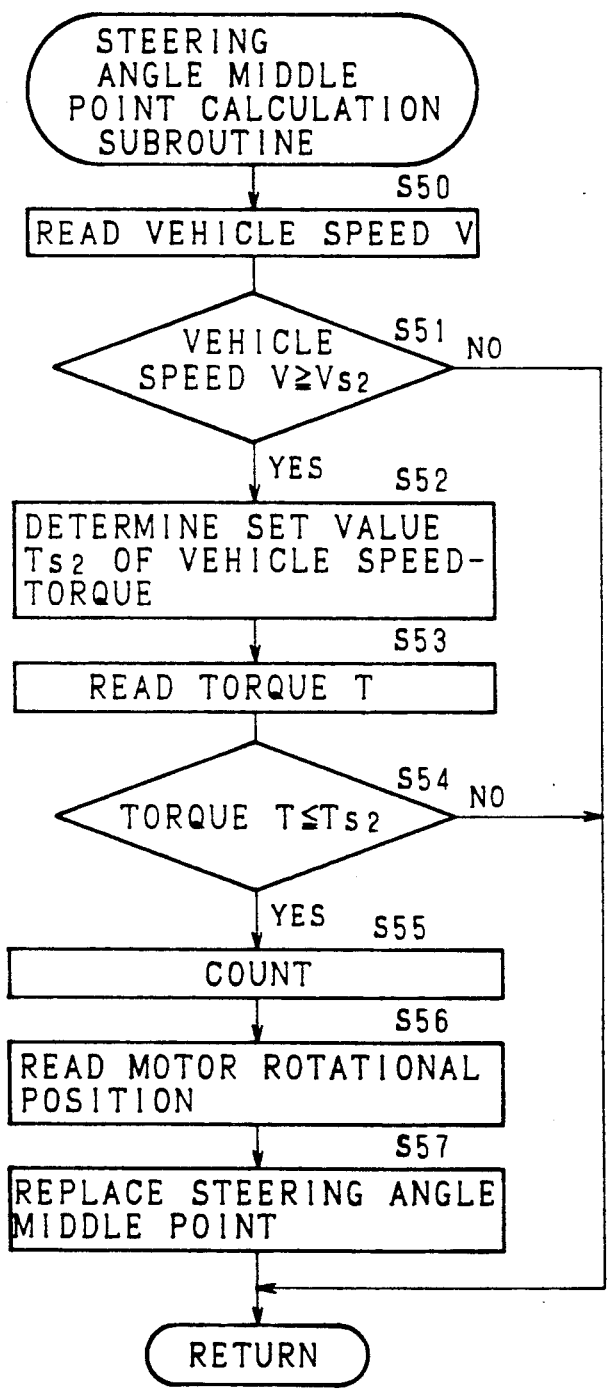
Figure 10:
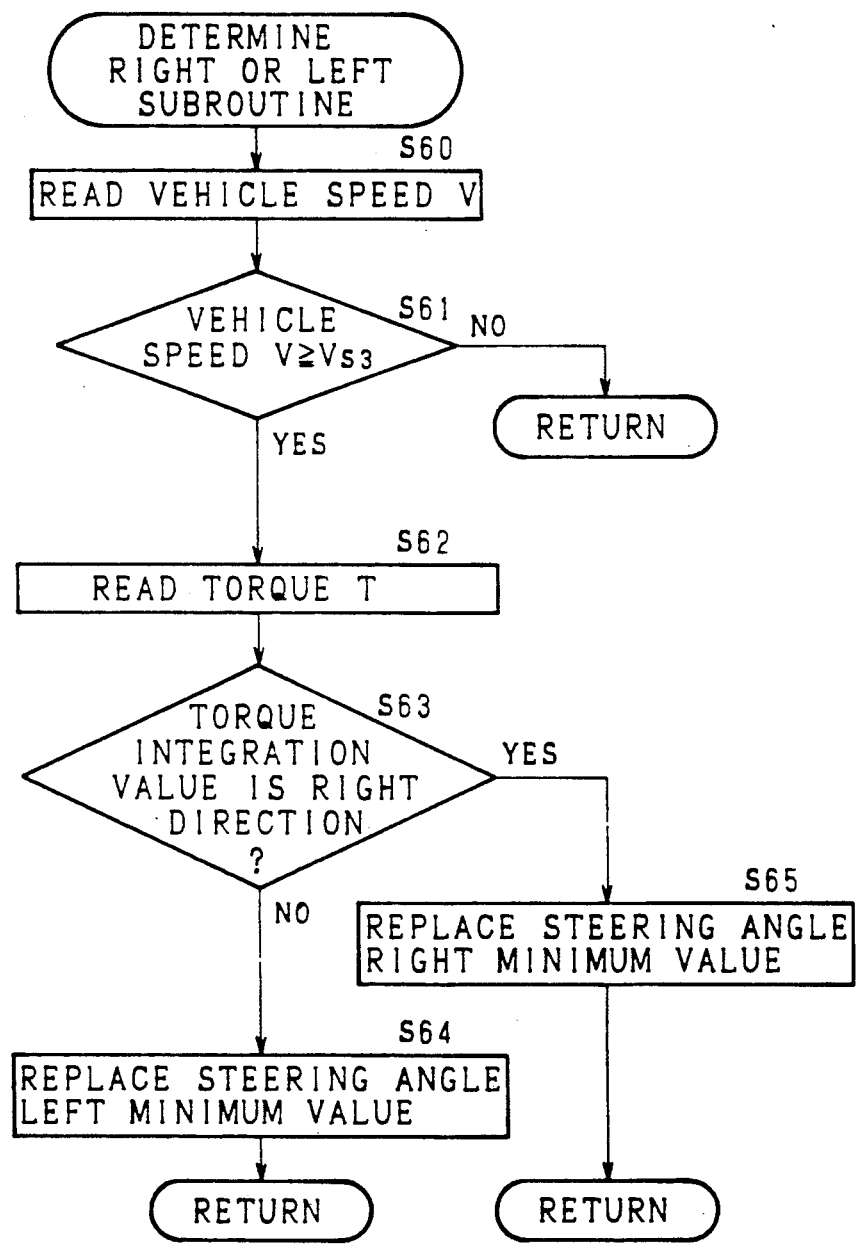
Figure 11:
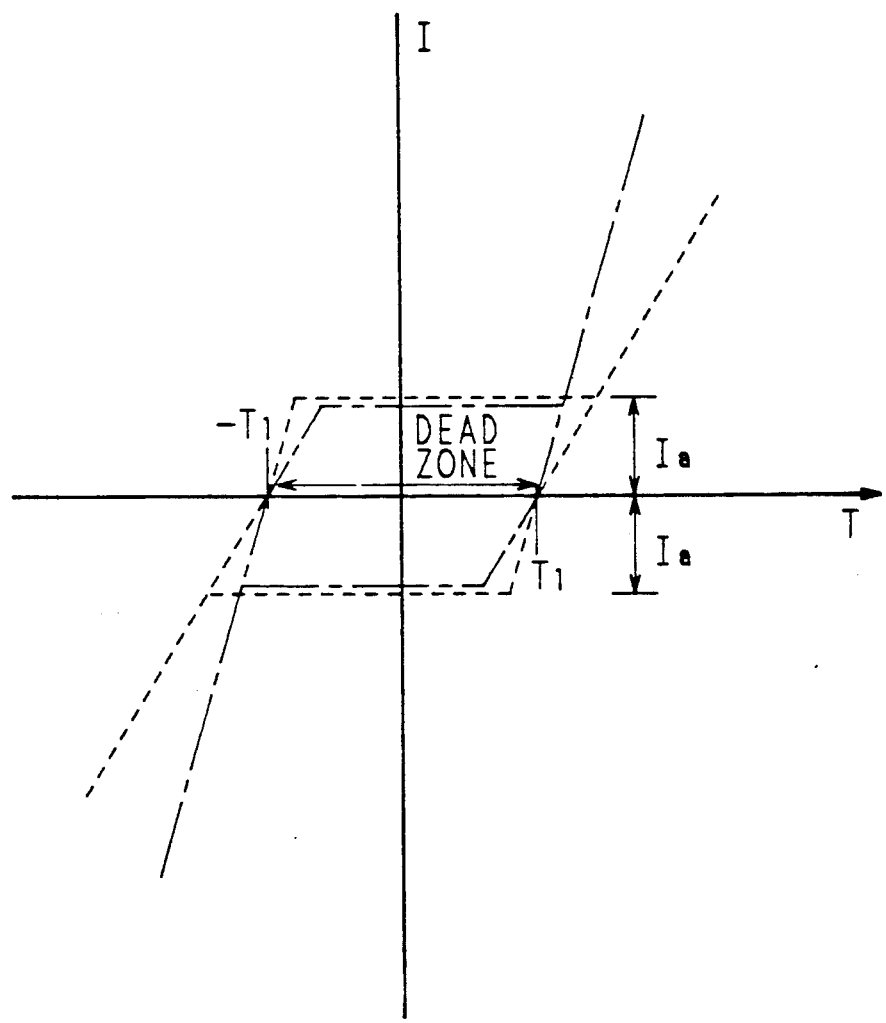
FIG. 11 is a graph showing a characteristic of relation between motor current and torque at an indicator current function unit.

Next, explanation will be given on the calculating the middle point of the steering wheel, and the return control using it. FIG. 8, FIG. 9 and FIG. 10 are flow charts showing the return control of the steering wheel, the calculation of the middle point, and the decision procedure for the right-left position of the steering wheel respectively. FIG. 11 is a graph showing the characteristic of the relation between the motor current and the torque at the indicator current function unit, the axis of ordinate showing the indicator current I, and the axis of abscissa the torque T. Still more, the broken line and the dashed line show respectively the characteristics when the vehicle speed is large and small.

In the FIG. 8, at first, in Step 40, the torque T is read, and whether or not the torque T is in the dead zone is judged in Step 41, and when the torque T is in the dead zone, whether or not the middle point calculation routine to be described later is finished is judged in Step 42. When the middle point calculation is finished, the rotational position of the motor 8 is read from the rotary detector 17 in Step 43, and in the next Step 44, the steering angle θ is decided at the steering angle decision circuit 71d by using the rotational position and the middle point. When the steering angle θ is decided, in Step 45, by using the steering angle θ and the vehicle speed V, variable current Ia is calculated at the variable current function unit 73c, the value and direction of the indicator current I being calculated at the indicator current function unit 73a.

On the other hand, in Step 41, when the torque T is judged not to be in the dead zone, processing returns and in Step 42, when the middle point calculation is not finished, in Step 46, the rotational direction of the motor 8 is read from the rotary detector 17, and in Step 47, variable current Ia is calculated from the steering angle minimum value set at the right-left decision routine to be described later, the value and direction of the indicator current I being calculated.

In the middle point calculation routine shown in FIG. 9, the vehicle speed V is read in Step 50, and whether or not the vehicle speed V is larger than a threshold $V_{S2}$ is judged in Step 51, and when larger, the torque set value $T_{S2}$ correspondingly to the vehicle speed is set in Step 52, and next in Step 53, the torque T is read, and in Step 54, whether or not the torque T is smaller than the torque set value $T_{S2}$ is judged. When smaller, in Step 55, the number of the torque T is counted at that time and in Step 56, the rotational position of the motor 8 is read. In Step 57, the rotational position is added to the sum of the ones up to the last time, the added result being divided by the number of counts to calculate the steering angle middle point, thereby replacing the value of the steering angle middle point. In Step 51, when the vehicle speed V is smaller than the threshold $V_{S2}$, or the torque T is larger than the torque set value $T_{S2}$, processing returns.

As the middle point calculation requires much time to calculate, until the calculation is finished, the return control is carried out by the right-left decision routine to be explained next.

At the right-left decision routine shown in FIG. 10, in Step 60, the vehicle speed V is read, and in Step 61, whether or not the vehicle speed V is larger than the threshold $V_{S3}$ is judged, and when larger, the torque T is read in Step 62, and in Step 63, the torque T is integrated, and whether the direction of the integrated value is right or left is judged. When the direction is right, in Step 65, the right value of the steering angle minimum value is replaced, and when left, in Step 64, the left value of the steering angle minimum value is replaced and processing returns On the other hand, as shown in FIG. 11, when the variable current Ia is calculated by the steering angle θ in the return control, the indicator current I, at a time of the return control of the steering wheel when the torque is in the dead zone, is changed correspondingly to the variable current Ia and the vehicle speed V. For example, when the vehicle speed V is large, as shown with a broken line, the increasing rate of the indicator current I is enlarged when the torque T enters the dead zone, and the motor 8 is controlled so that the return to the middle point is made faster. On the contrary, when the vehicle speed is small, as shown with a dashed line, the increasing rate of the indicator current I is eeduced when the torque T enters the dead zone, and the motor 8 is controlled so that the return to the middle point is made slower.

The foregoing enables the stabilized steering feeling to be gained, since the increasing direction of the indicator current I is contrary during the time of the assist control and during the time of the return control.

As explained above, according to this embodiment, when the steering torque is in the dead zone, the indicator current to the motor 8 is changed corresponding to the steering angle, and when the steering torque is outside the dead zone, the indicator current I is changed corresponding to the steering torque. As a result the characteristics of the indicator current are smooth and continuous, leading to comfortable steering feeling.

Next, another embodiment will be explained. In the embodiment aforementioned, the increasing rate of the indicator current Ia corresponding to the steering angle θ is enlarged as the vehicle speed V increases. In this case, the increasing rate is small when the vehicle speed is low, and variable current Ia is small when the steering angle θ is small.

In this embodiment, in changing the variable current by using the steering angle θ, the increasing rate is made to be minimum when the vehicle speed V is within the predetermined range, and the increasing rate is made larger when the vehicle speed is lower or higher than the range. This enables a large variable current Ia to be gained even when the vehicle speed is low.

Still, the vehicle speed sensor 18 detects the vehicle speed by using the vehicle speed block of 5 km/h unit and detects 0 km/h–180 km/h by using 36 steps from 0th block to 35th block.

Next, explanation will be given on the control at the control unit 7 in the second embodiment.

Figure 12:
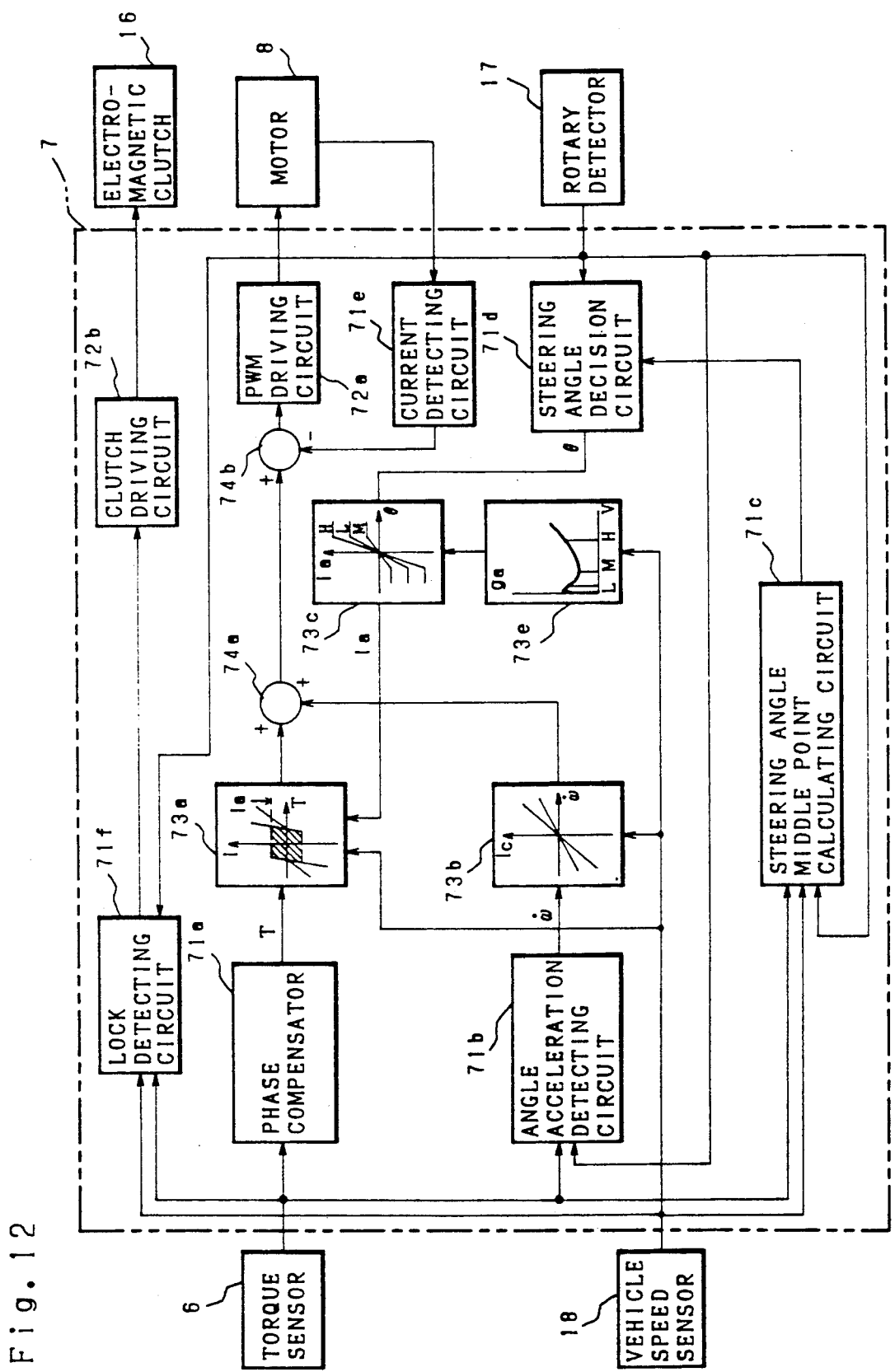
FIG. 12 is a block diagram showing construction and operation of a control unit of another embodiment.

FIG. 12 is a block diagram showing the construction and control operation of the control unit of another embodiment.

The torque detecting signal of the torque sensor 6 is respectively inputted into the phase compensation circuit 71a for advancing its phase and making the responsibility better, the angle acceleration detecting circuit 71b for detecting the angle acceleration ω of the rotation of the steering wheel, the middle point calculating circuit 71c for deciding the middle point of the steering mechanism and the lock detecting circuit 71f for detecting the lock of the motor 8.

The vehicle speed detecting signal of the vehicle speed sensor 18 is respectively inputted to the indicator current function unit 73a which is given outputs from the lock detecting circuit 71f, the steering angle middle point calculating circuit 71c, the phase compensation circuit 71a and variable current Ia to be described later, while deciding the indicator current I to the motor 8 correspondingly to the torque T and the vehicle speed V when the torque is not in the dead zone, and deciding the indicator current I to the motor 8 correspondingly to the variable current Ia when the torque is in the dead zone, to the compensation current function unit 73b which is given the angle acceleration ω of the steering wheel outputted from the angle acceleration detecting circuit 71b and decides the compensation current Ic for compensating the force of inertia at the acceleration and deceleration time of the motor 8 and the force of inertia of the base carrier of the vehicle, correspondingly to the angel acceleration ω and vehicle speed V, and to the return quantity function unit 73e for deciding the return quantity $g_a$ of the steering wheel corresponding to the vehicle speed V. Return quantity $g_a$ shows the inclination against the steering angle θ of the variable current Ia, the return quantity $g_a$ being given the steering angle θ outputted from the steering angle decision circuit 71d, being inputted to the variable current function unit 73c for deciding variable current Ia changing the characteristics of the indicator current I correspondingly to the steering angle $\theta$ and return quantity $g_a$.

Return quantity $g_a$ as shown in FIG. 12, becomes the minimum when the vehicle speed is in the specified block M (in this example, in the second block of 10-15 km/h), and return quantity $g_a$ becomes large as the vehicle speed reaches to the big block H or small block L, thereby, in a low speed, enough return control can be carried out.

The rotary detecting signal of the rotary detector 17 is inputted to the steering angle decision circuit 71d for deciding the steering angle $\theta$ from the lock detecting circuit 71f, steering angle middle point calculating circuit 71c, angle acceleration detecting circuit 71b and the rotary detecting signal and the middle point of the steering angle middle point calculating circuit 71c.

Next, explanation will be given on the middle point calculation of the steering wheel and the return control of the steering wheel using thereof which is the essential part of the invention.

Figure 13:
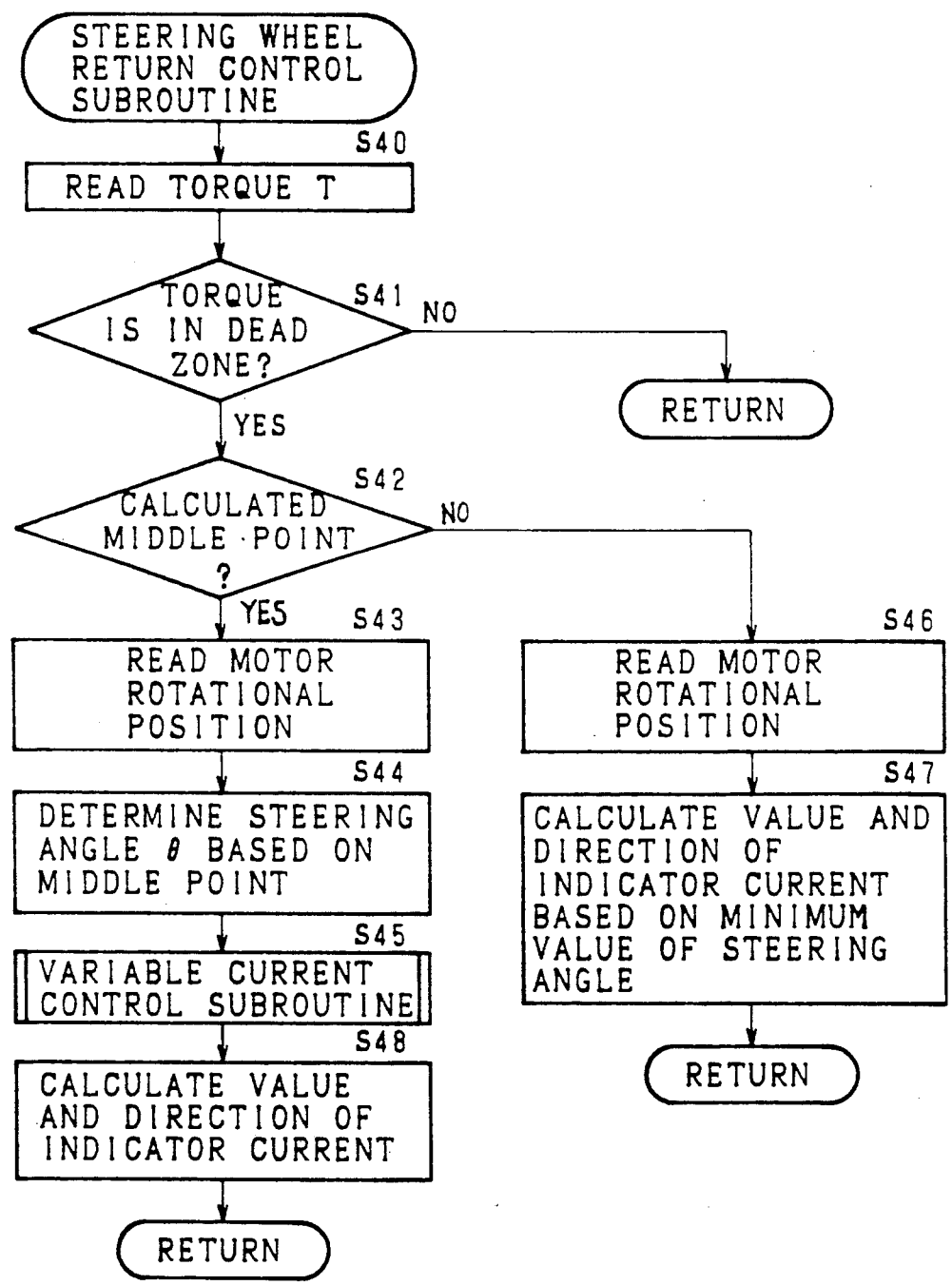
FIG. 13 is a flow chart of the return control of another embodiment.
Figure 14:
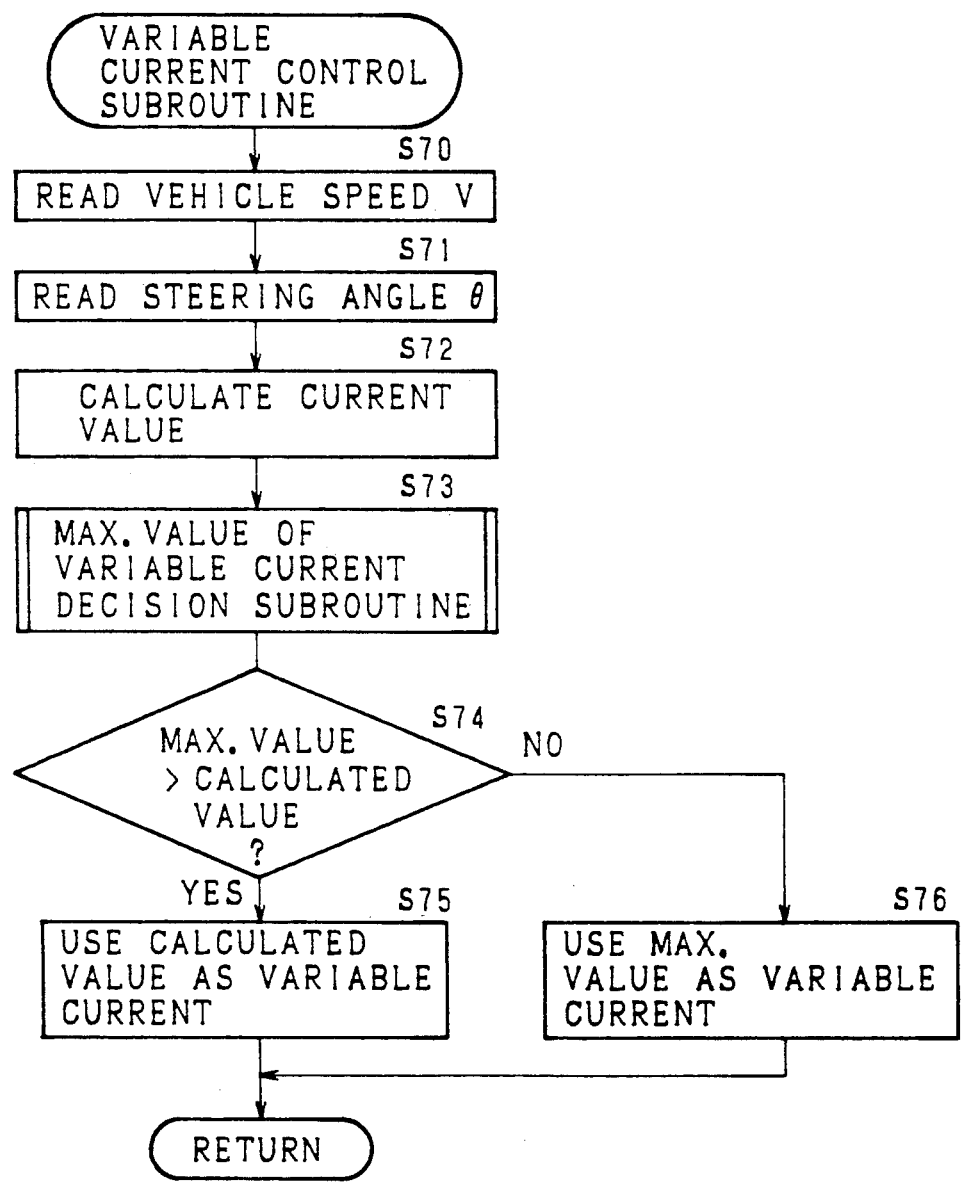

FIG. 13, FIG. 14, and FIG. 15 are flow charts respectively showing the return control of the steering wheel, variable current controlling and the decision procedure of the maximum value of the variable current.

In FIG. 13, at first, in Step 40, the torque T is read, and in Step 41, whether or not the torque T is in the dead zone is judged, and when the torque is in the dead zone, whether or not the middle point calculation routine is finished is judged in Step 42. When the middle point calculation is finished, the rotational position of the motor 8 is read from the rotary detector 17 in Step 43, next, in Step 44, the steering angle $\theta$ is decided at the steering angle decision circuit 71d by using the rotational position and the middle point. When the angle $\theta$ is decided, in Step 45, processing moves to the variable current control subroutine the value and direction of the indicator current I is calculated by using the variable current Ia obtained therefrom at the indicator current function unit 73a (Step 48).

On the other hand, when the torque T is judged not to be in the dead zone in Step 41, processing returns, and when the middle point calculation is not finished in Step 42, the rotational position of the motor 8 is read from the rotary detector 17 in Step 46, and in Step 47, variable current Ia is calculated by the steering angle minimum value set at the right-left decision subroutine to be described later.

At the variable current control subroutine shown in FIG. 14, in Step 70, the vehicle speed V is read, and the steering angle $\theta$ is read in Step 71. Return quantity $g_a$ corresponding to the vehicle speed V is calculated by using the above at the return quantity function unit 73e shown in FIG. 12, thereby the calculated value Ik of the variable current Ia corresponding to the return quantity $g_a$ and the steering angle $\theta$ at the variable current function unit 73c is calculated (Step 72). Next, processing moves to the maximum value decision subroutine, the maximum value Im is set (Step 73), and in Step 74, whether or not the maximum value Im>the calculated value Ik is judged, and when Im>Ik, the calculated value Im is used as the variable current Ia (Step 75), and when Im≦Ik, the maximum value Im is used as the variable current Ia (Step 76), and processing returns to the return control subroutine in Step 45.

At the maximum value decision subroutine of variable current Ia shown in FIG. 15, at first, in Step 80 whether or not the vehicle speed block is the 0th block (=0-5 km/h) is judged, and when it is in 0th block, whether or not the vehicle speed edge of the vehicle speed sensor 18 is detected is judged (Step 81). In the case where the vehicle speed edge is not detected (=YES), the vehicle is judged to be stopped, the first counter $C_1$ being counted up, and the stopping time is calculated (Step 82).

Whether or not the counted value (in this example, the stopping time is more than five seconds) is more than the constant value is judged (Step 83), and when the vehicle stops more than that constant time, the second counter $C_2$ is counted up (Step 84). This is carried out to make the maximum value Im of the variable current Ia subsequently smaller, deciding the maximum value Im of the variable current Ia finally to be zero as the time passes during the stopping time.

On the other hand, in Step 80, in the case where the vehicle speed block is not in the 0th block, or in Step 80, in the case where the vehicle speed edge of the vehicle speed sensor 18 is detected, the first counter $C_1$ is cleared (Step 86), and the second counter $C_2$ is counted down (Step 87). This is carried out to decide the maximum value Im by increasing the maximum value Im of the variable current Ia subsequently as the time passes during the running time. When the maximum value is decided, processing returns to the variable current control subroutine in Step 73.

This controls the variable current Ia to be zero during the stopping time and the indicator current I to be zero when the torque is in the dead zone thereby preventing continued flow of the variable current I, during the stopping times and preventing the motor 8 from burning.

On the other hand, as shown in FIG. 11, in the return control, when variable current Ia is calculated by the return control subroutine shown in FIG. 13, the indicator current I at the time of the return control of the steering wheel is changed at the time when the torque is in the dead zone corresponding to the variable current Ia and the vehicle speed V. When the vehicle speed V is large, for example, as shown with the broken line, the increasing rate of the indicator current I is made larger and the motor 8 is controlled so that the return to the middle point is made faster when the torque T enters into the dead zone, and on the contrary, when the vehicle speed is in the middle, as shown with the dashed line, the increasing rate of the indicator current I is made smaller and the motor is controlled so that the return to the middle point is made slower when the torque T enters into the dead zone.

This enables the increasing rate of the indicator current I to be contrary to each other during the time of the assist control and return control, thereby the stabilized steering feeling can be obtained.

Still in aforesaid two embodiments, explanation is given on the power steering apparatus of the rack and pinion type, but the invention is not restricted to that type.

Still more, in the aforesaid two embodiments, the rotary detector installed on the motor is used as the steering angle detecting means, but the invention is not restricted to this, and any steering angle detecting means will do if it is capable of detecting the steering angle of the steering mechanism.

Furthermore, in the aforesaid two embodiments, the characteristics of the indicator current is changed correspondingly to the vehicle speed, but the invention is not restricted to this, and the characteristics do not have to be changed correspondingly to the vehicle speed.

As above explained, according to the present invention, since the indicator current to the motor is changed corresponding to the steering angle and the vehicle speed when the steering torque is in the dead zone, and when the steering torque is not in the dead zone, the indicator current is changed corresponding to the steering torque, even when running in a low speed with big steering angle as in the case of backing a vehicle into a garage the return control is fully carried out, thereby the steering wheel can be returned to the middle point without hand operation aided by a driver's visual observation, whereby simplifying the steering operation, and good neutral feeling and the steering feeling reduced of sense of compatibility can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power steering apparatus comprising,
   a steering mechanism for converting rotations of a steering wheel into a movement for steering a vehicle to right or left direction;
   a steering angle detecting means for detecting a steering angle of said steering mechanism;
   a torque sensor for detecting a steering torque exerted on said steering wheel;
   a motor for assisting steering force;
   a first electric current control means for controlling a driving current of said motor corresponding to said steering torque, when a detected steering torque is outside a dead zone; and
   a second electric current control means for alternately controlling a driving current of said motor corresponding to said steering angle, when a detected steering torque is within said dead zone.

2. A power steering apparatus as set forth in claim 1, wherein said first electric current control means increases said driving current corresponding to the increase of said steering torque.

3. A power steering apparatus as set forth in claim 1, wherein said second electric current control means increases said driving current corresponding to the increase of said steering angle.

4. A power steering apparatus as set forth in claim 1, further comprising a vehicle speed detecting means for detecting a speed of said vehicle,
   said second electric current control means making said driving current to be minimum when the detected vehicle speed is within a predetermined range.

5. A power steering apparatus as set forth in claim 2, further comprising a vehicle speed detecting means for detecting a speed of said vehicle,
   said first electric current control means changing the increasing rate of said driving current to the increase of steering torque corresponding to the detected vehicle speed.

6. A power steering apparatus as set forth in claim 3, further comprising a vehicle speed detecting means for detecting a speed of said vehicle,
   said second electric current control means changing the increasing rate of said driving current to the increase of the steering angle corresponding to the detected vehicle speed.

7. A power steering apparatus as set forth in claim 1, wherein said steering angle detecting means sets said steering angle by the detection of the rotational position of said motor.

8. A power steering apparatus comprising,
   a steering mechanism for converting rotations of a steering wheel into a movement for steering a vehicle to right or left direction;
   a steering angle detecting means for detecting a steering angle of said steering mechanism;
   a torque sensor for detecting a steering torque exerted on said steering wheel;
   a motor for assisting steering force;
   a first electric current control means for controlling a driving current of said motor corresponding to said steering torque when a detected steering torque is outside a dead zone, wherein said first electric current control means increases said driving current corresponding to the increase of said steering torque; and
   a second electric current control means for alternately controlling a driving current of said motor corresponding to said steering angle when a detected steering torque is within said dead zone, wherein said second electric current control means increases said driving current corresponding to the increase of said steering angle.

9. A power steering apparatus as set forth in claim 8, further comprising a vehicle speed detecting means for detecting a speed of said vehicle,
   said second electric current control means making said driving current to be minimum when the detected vehicle speed is within a predetermined range.

10. A power steering apparatus as set forth in claim 8, further comprising a vehicle speed detecting means for detecting a speed of said vehicle,
    said first electric current control means changing the increasing rate of said driving current to the increase of steering torque corresponding to the detected vehicle speed.

11. A power steering apparatus as set forth in claim 8, further comprising a vehicle speed detecting means for detecting a speed of said vehicle,
    said second electric current control means changing the increasing rate of said driving current to the increase of the steering angle corresponding to the detected vehicle speed.

12. A power steering apparatus as set forth in claim 8, wherein said steering angle detecting means sets said steering angle by the detection of the rotational position of said motor.

13. A power steering apparatus comprising,
    a steering mechanism for converting rotations of a steering wheel into a movement for steering a vehicle to right or left direction;
    a steering angle detecting means for detecting a steering angle of said steering mechanism;
    a torque sensor for detecting a steering torque exerted on said steering wheel;
    a motor for assisting steering force;
    a first electric current control means for controlling a driving current of said motor corresponding to the steering torque detected by said torque sensor, when the detected steering torque is larger than a predetermined value, said first electric current control means increasing said driving current corresponding to the increase of the detected steering torque; and a second electric current control means for alternately controlling a driving current of said motor corresponding to the steering angle detected by said steering angle detecting means, when the detected steering torque is smaller than said predetermined value, said second electric current control means increasing said driving current corresponding to the increase of the detected steering angle, the values of said driving current controlled by said first and second electric current control means at said predetermined value being equal.

* * * * *

UNITED STATES PATENT AND TRADEMARK OFFICE
CERTIFICATE OF CORRECTION

PATENT NO. : 5,097,918
DATED : 3/24/92
INVENTOR(S) : DAIDO, et al

It is certified that error appears in the above-identified patent and that said Letters Patent is hereby corrected as shown below:

On the title page:
In the assignment data:

"Mitsubishi Denki Kabushiki Kaisha, Tokyo, Japan"

should be

--Koyo Seiko Co., Ltd., Osaka, Japan--

Signed and Sealed this

Twenty-sixth Day of May, 1992

Attest:

DOUGLAS B. COMER

*Attesting Officer*   Acting Commissioner of Patents and Trademarks